United States Patent
Lee et al.

(10) Patent No.: US 11,914,773 B2
(45) Date of Patent: Feb. 27, 2024

(54) BRAIN-MACHINE INTERFACE BASED INTENTION DETERMINATION DEVICE AND METHOD USING VIRTUAL ENVIRONMENT

(71) Applicant: Korea University Research and Business Foundation, Seoul (KR)

(72) Inventors: Seong-Whan Lee, Seoul (KR); Byoung-Hee Kwon, Seoul (KR); Ji-Hoon Jeong, Seoul (KR); Kyung-Hwan Shim, Seoul (KR); Byeong-Hoo Lee, Seoul (KR)

(73) Assignee: Korea University Research and Business Foundation, Seoul (KR)

( * ) Notice: Subject to any disclaimer, the term of this patent is extended or adjusted under 35 U.S.C. 154(b) by 0 days.

(21) Appl. No.: 17/152,909

(22) Filed: Jan. 20, 2021

(65) Prior Publication Data

US 2021/0255706 A1     Aug. 19, 2021

(30) Foreign Application Priority Data

Feb. 18, 2020 (KR) .......................... 10-2020-0019493

(51) Int. Cl.
*G06F 3/01*    (2006.01)
*G06N 20/00*    (2019.01)

(52) U.S. Cl.
CPC .............. *G06F 3/015* (2013.01); *G06N 20/00* (2019.01)

(58) Field of Classification Search
None
See application file for complete search history.

(56) References Cited

U.S. PATENT DOCUMENTS

| | | | |
|---|---|---|---|
| 2012/0203725 A1* | 8/2012 | Stoica ..................... | G06F 3/015 706/46 |
| 2018/0136725 A1* | 5/2018 | Hurst ....................... | G06F 3/011 |
| 2019/0350478 A1 | 11/2019 | Leuthardt et al. | |
| 2020/0073475 A1* | 3/2020 | Keane ..................... | G06N 20/00 |

FOREIGN PATENT DOCUMENTS

| | | |
|---|---|---|
| KR | 10-1518575 B1 | 5/2015 |
| KR | 10-1842750 B1 | 3/2018 |
| KR | 10-2018-0065709 A | 6/2018 |
| KR | 10-2029219 B1 | 10/2019 |
| KR | 10-2038203 B1 | 10/2019 |

OTHER PUBLICATIONS

Korean Notice of Allowance dated May 12, 2021 in counterpart Korean Patent Application No. 10-2020-0019493 (2 pages in Korean).

* cited by examiner

*Primary Examiner* — Carl Adams
(74) *Attorney, Agent, or Firm* — NSIP Law

(57) ABSTRACT

Provided is a brain-machine interface based intention determination device using a virtual environment, including: an input unit that receives a control mode; a training output unit that outputs training information; a collection unit that collects a brain signal; a first preprocessing unit that extracts time-frequency information; a second preprocessing unit that generates physical information; a learning unit that learns control information according to a pattern of physical information; a determination unit that determines control information; and a command output unit that outputs a control command matching the control information.

16 Claims, 8 Drawing Sheets

BRAIN-MACHINE INTERFACE BASED INTENTION DETERMINATION DEVICE AND METHOD USING VIRTUAL ENVIRONMENT

CROSS-REFERENCE TO RELATED APPLICATIONS

This application claims priority under 35 U.S.C. § 119 to Korean Patent Application No. 10-2020-0019493, filed on Feb. 18, 2020, in the Korean Intellectual Property Office, the disclosure of which is incorporated herein by reference in its entirety.

TECHNICAL FIELD

The present disclosure relates to a brain-machine interface based intention determination device and a method using a virtual environment, and more particularly, to an intention determination device and a method providing a training method according to the type of imagination so that a user's intention can be accurately determined in a brain-machine interface.

BACKGROUND

Brain signals are electrical signals obtained by attaching electrodes to the surface of the head and non-invasively measure the electrical activity of the brain. Such brain signals change in time and space according to the activity of the brain, and may show temporal features, band-specific features according to frequency, and spatial features.

In general, brain signals can be divided according to the range of vibrating frequencies, and are divided into delta waves, alpha waves, beta waves, theta waves, gamma waves, and the like. In this regard, delta waves are also called sleep waves, occur during sleep, and appear at a frequency of 0.2 to 3.99 Hz. Alpha waves occur in a state of relaxation in which the mind and body are stable, and appear at a frequency of 8 to 12.99 Hz. Beta waves occur when a person feels anxiety, tension, or the like, and appear at a frequency of 13 to 30 Hz. Gamma waves appear at a frequency of 30 Hz or more, and occur during extreme awareness and excitement. There are also mu-band waves that appear at a frequency of 8 to 13 Hz in the motor cortex of the brain when a person imagines a motion or a state of movement.

SUMMARY

A technical object to be achieved by the present disclosure is to provide an intention determination device and a method that provide a training method according to the type of imagination so that a user's intention can be accurately determined in a brain-machine interface.

According to an aspect of the present disclosure, a brain-machine interface based intention determination device using a virtual environment includes: an input unit that receives a control mode from a user; a training output unit that outputs training information set according to the control mode; a collection unit that collects a brain signal generated from a user's imagination for the training information; a first preprocessing unit that extracts frequency information according to a preset frequency band from the brain signal, and extracts time-frequency information of a preset time interval from the frequency information; a second preprocessing unit that generates physical information indicating a physical size of the time-frequency information; a learning unit that generates a classification model by learning control information indicating a user's intention according to a pattern of physical information provided in advance; a determination unit that determines control information according to the physical information based on the classification model; and a command output unit that outputs a control command matching the control information.

In addition, the control mode may further include: an imagination mode classified according to a type of imagination; a space mode representing a space provided in advance as a virtual environment; and a motion mode representing a motion provided to be imagined by the user according to the imagination mode and the space mode.

In addition, the input unit may receive at least one imagination mode among a motor imagery mode, a visual imagery mode, and a speech imagery mode.

In addition, in a case where the imagination mode is the motor imagery mode, the first preprocessing unit may extract frequency information from a frequency band of 8 Hz to 13 Hz.

In addition, in a case where the imagination mode is the visual imagery mode, the first preprocessing unit may extract frequency information from a frequency band of 8 Hz to 12 Hz.

In addition, in a case where the imagination mode is the speech imagery mode, the first preprocessing unit may extract frequency information from a frequency band of 10 Hz to 15 Hz.

In addition, the second preprocessing unit may generate the physical information by calculating a power spectral density from the time-frequency information.

According to another aspect of the present disclosure, an intention determination method of determining a user's intention according to a brain-machine interface based intention determination device using a virtual environment includes: a step of receiving a control mode input from a user; a step of outputting training information set according to the control mode; a step of collecting a brain signal generated from a user's imagination for the training information; a step of extracting frequency information according to a preset frequency band from the brain signal, and extracting time-frequency information of a preset time interval from the frequency information; a step of generating physical information indicating a physical size of the time-frequency information; a step of determining control information according to the physical information based on a classification model generated by learning control information indicating a user's intention according to a pattern of the physical information provided in advance; and a step of outputting a control command matching the control information.

In addition, the control mode may further include: an imagination mode classified according to a type of imagination; a space mode representing a space provided in advance as a virtual environment; and a motion mode representing a motion provided to be imagined by the user according to the imagination mode and the space mode.

In addition, in the step of receiving a control mode, at least one imagination mode among a motor imagery mode, a visual imagery mode, and a speech imagery mode may be input.

In addition, in the step of extracting time-frequency information, in a case where the imagination mode is the motor imagery mode, frequency information may be extracted from a frequency band of 8 Hz to 13 Hz.

In addition, in the step of extracting time-frequency information, in a case where the imagination mode is the visual imagery mode, frequency information may be extracted from a frequency band of 8 Hz to 12 Hz.

In addition, in the step of extracting time-frequency information, in a case where the imagination mode is the speech imagery mode, frequency information may be extracted from a frequency band of 10 Hz to 15 Hz.

In addition, in the step of generating physical information, the physical information may be generated by calculating a power spectral density from the time-frequency information.

According to the aspects of the present disclosure described above, by providing the brain-machine interface based intention determination device and the method using a virtual environment, it is possible to provide a training method according to the type of imagination so that a user's intention can be accurately determined in a brain-machine interface.

DETAILED DESCRIPTION OF EMBODIMENTS

Figure 1:
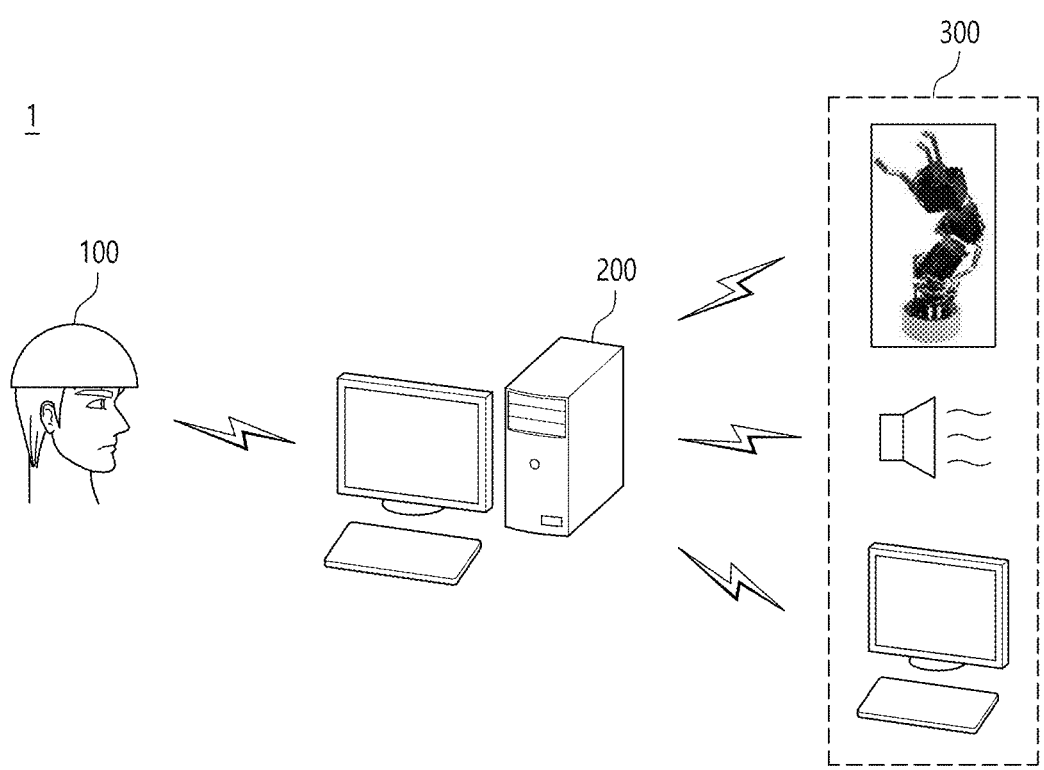
FIG. 1 is a schematic diagram of an intention determination system including a brain-machine interface based intention determination device using a virtual environment according to an embodiment of the present disclosure.

The detailed description of the present disclosure to be described below refers to the accompanying drawings, which illustrate specific embodiments in which the present disclosure may be implemented. These embodiments are described in detail sufficient to enable those skilled in the art to implement the present disclosure. It should be understood that various embodiments of the present disclosure are different from each other but need not be mutually exclusive. For example, specific shapes, structures, and characteristics described herein may be implemented in other embodiments without departing from the spirit and scope of the present disclosure in relation to one embodiment. In addition, it should be understood that the location or arrangement of individual constituent elements within each disclosed embodiment may be changed without departing from the spirit and scope of the present disclosure. Therefore, the detailed description to be described below is not intended to be taken in a limiting sense, and the scope of the present disclosure, if properly described, is limited only by the appended claims, along with all scopes equivalent to those claimed by the claims. Like reference numerals in the drawings refer to the same or similar functions over several aspects.

Hereinafter, preferred embodiments of the present disclosure will be described in more detail with reference to the drawings.

FIG. 1 is a schematic diagram of an intention determination system including a brain-machine interface based intention determination device using a virtual environment according to an embodiment of the present disclosure.

An intention determination system 1 may include a brain signal measurement device 100, an intention determination device 200, and an external device 300.

The brain signal measurement device 100 may be provided with at least one electrode to detect a brain signal, a biosignal, or the like of a user, and the brain signal measurement device 100 may be provided with a measurer that records the brain signal, the biosignal, or the like transmitted from the electrode.

Here, the brain signal may mean a change in potential due to the activity of the cerebral cortex and a brain current generated by brainwaves, and accordingly, the brain signal measurement device 100 may use electroencephalography (EEG) to record the brain current.

Accordingly, the brain signal measurement device 100 may detect an event-related desynchronization (ERD)/event-related synchronization (ERS) pattern from the brain signal.

In this regard, the measurer may receive the brain signal or the biosignal from the electrode through wired or wireless communication.

Meanwhile, the brain signal measurement device 100 may measure brain signals in a plurality of brain regions and transmit the measured brain signals to the intention determination device 200 using a wired or wireless network.

At this time, the brain signal measurement device 100 may measure the brain signal or the biosignal by an external input, or the brain signal measurement device 100 may measure the brain signal or the biosignal at each preset time interval.

Accordingly, the intention determination device 200 may receive and collect the brain signal from the brain signal measurement device 100 through the wired or wireless network.

Meanwhile, the intention determination device 200 may receive control modes input from the user. Here, the control modes may include an imagination mode classified according to the type of imagination, a space mode including at least one space prepared in advance as a virtual environment, and a motion mode including at least one motion provided to be imagined by the user according to the imagination mode and the space mode.

Here, the imagination mode may include is a motor imagery mode, which means that the user imagines performing an arbitrary motion, a visual imagery mode, which means that the user imagines an arbitrary visual scene, and a speech imagery mode in which the user images making an arbitrary sound.

For example, the motor imagery mode may be a control mode provided to allow the user to imagine a motion of holding a cup existing at a certain position with the hand by moving the arm, the visual imagery mode may be a control mode provided to allow the user to imagine a shape of a beach, and the speech imagery mode may be a control mode provided to allow the user to imagine pronouncing the sentence "Hello".

In this regard, motor imagery can be detected in a frequency band of 8 Hz to 13 Hz of brain signals, motor imagery can activate mainly the primary motor cortex among the brain regions, and ERD/ERS patterns are detected.

In addition, visual imagery can be detected in a frequency band of 8 Hz to 12 Hz, and visual imagery can activate mainly the frontal lobe and occipital lobe among the brain regions.

Speech imagery can be detected in a frequency band of 8 Hz to 30 Hz, and speech imagery can activate mainly the left lower frontal cortex (Broca's Area), the left temporal cortex (Wernicke's Area), the premotor cortex, and the supplementary motor area among the brain regions.

On the other hand, the motion provided in the intention determination device 200 may be designed as at least one motion using a 3D graphic tool such as Blender, and the space in which the designed motion is performed can be designed as at least one virtual environment using a 3D development platform such as Unity 3D.

The intention determination device 200 may output training information set according to the control modes. Here, the training information may mean the control mode selected according to a user's input.

For example, the intention determination device 200 may receive the motor imagery mode as the imagination mode from the user, the intention determination device 200 may receive a laboratory as the space mode from the user, and the intention determination device 200 may receive a motion of picking up a cup as the motion mode from the user.

In this case, the training information may include the motor imagery mode, the laboratory, and the motion of picking up a cup, and accordingly, the intention determination device 200 may output a space and a motion designed in advance.

In this case, the space and the motion designed in advance may be images executed in a 3D virtual environment. In this regard, the intention determination device 200 may output an image of a person's arm moving toward the cup and then picking up the cup by the hand.

In addition, the intention determination device 200 may receive the speech imagery mode as the imagination mode from the user, the intention determination device 200 may receive a corridor as the space mode from the user, and the intention determination device 200 may receive a motion pronouncing "Excuse me" as the motion mode from the user.

In this case, the training information may include the speech imagery mode, the corridor, and the motion of pronouncing "Excuse me", and accordingly, the intention determination device 200 may output a space and a motion designed in advance.

At this time, the space and the motion designed in advance may be an image and a voice executed in the 3D virtual environment. In this regard, the intention determination device 200 may output an image showing a person pronouncing "Excuse me", and the intention determination device 200 may output a voice pronouncing "Excuse me".

As described above, the intention determination device 200 may have an effect of inducing a user's imagination for controlling the external device 300 through the 3D virtual environment output according to the control mode input from the user.

The intention determination device 200 may collect a brain signal generated from a user's imagination for the training information.

In addition, the intention determination device 200 may extract frequency information from the brain signal according to a preset frequency band, and the intention determination device 200 may extract time-frequency information of a preset time range from the frequency information.

Here, the intention determination device 200 may extract the frequency information by inputting the brain signal to a band pass filter that passes a preset frequency band, or the intention determination device 200 may extract the frequency information by inputting the brain signal to a band reject filter that rejects frequencies other than the preset frequency band.

At this time, the intention determination device 200 may extract the frequency information from frequency bands set differently according to the control modes.

For example, in a case where the control mode is the motor imagery mode, the intention determination device 200 may extract the frequency information from a frequency band of 8 Hz to 13 Hz, in a case where the control mode is the visual imagery mode, the intention determination device 200 may extract the frequency information from a frequency band of 8 Hz to 12 Hz, and in a case where the control mode is the speech imagery mode, the intention determination device 200 may extract the frequency information from a frequency band of 10 Hz to 15 Hz.

Meanwhile, the intention determination device 200 may extract a plurality of pieces of frequency information from the brain signal, and for this, the intention determination device 200 may extract the frequency information from a plurality of frequency bands according to a preset frequency range.

For example, the intention determination device 200 may classify a frequency band of 8 Hz to 30 Hz into delta waves (0.5 Hz to 3.99 Hz), theta waves (4 Hz to 7.99 Hz), alpha waves (8 Hz to 12.99 Hz), beta waves (13 Hz to 30 Hz), gamma waves (30 Hz or more), mu-band waves (8 Hz to 13 Hz), and the like, which are frequency bands of brain signals, and my extract frequency information from each frequency band of the brain signals.

In addition, the intention determination device 200 may extract frequency information from a plurality of frequency bands according to a frequency range of 3 Hz to 4 Hz from a frequency band of 8 Hz to 30 Hz. In this case, the plurality of frequency bands may be set to 8 Hz to 12 Hz, 13 Hz to 16 Hz, 17 Hz to 20 Hz, . . . , and 27 Hz to 30 Hz.

Meanwhile, the intention determination device 200 may extract time-frequency information of a preset time range from the extracted frequency information, and in this case, the intention determination device 200 may extract a plurality of pieces of time-frequency information from one piece of frequency information.

For example, the intention determination device 200 may extract time-frequency information of a time range of 5,000 ms from the extracted frequency information of 30,000 ms, and in this case, the time-frequency information may be extracted at time interval of 2,000 ms from one piece of frequency information.

The intention determination device 200 may generate physical information indicating a physical size of the extracted time-frequency information. In this case, the intention determination device 200 may generate the physical information by calculating a power spectrum density from the extracted time-frequency information.

In this regard, the power spectral density means energy appearing from a finite signal, and since a method of calculating the power spectral density is commercially available, a detailed description thereof will be omitted.

The intention determination device 200 may generate a classification model by learning control information indicating a user's intention according to a pattern of physical information provided in advance.

Here, the pattern of the physical information may be determined by a frequency band and a time range of the time-frequency information from which the physical information is generated, a temporal position of the time-frequency information in the frequency information, or the like.

In addition, the control information may mean a motion of a part of the body, a visual scene, an action that makes a sound, or the like. Accordingly, the classification model can be understood as being obtained by learning the pattern of the physical information for the brain signal occurring by a visual scene, an action that makes a sound, or the like.

In this regard, the intention determination device 200 may learn the classification model using a deep learning technique such as a convolution neural network and a recurrent neural network.

Here, the convolutional neural network may include an input layer, at least one feature extraction layer, and a prediction layer. Accordingly, the convolutional neural network is a technique of, in a case where input information is input to the input layer, extracting a feature by performing a convolution between a filter prepared in advance in at least one feature extraction layer and the input information, and thus can classify the input information according to the extracted feature.

For this, the intention determination device 200 may receive the control information according to the pattern of the physical information from a server device provided in a hospital, a medical institution, a research institution, or the like.

The intention determination device 200 may determine the control information according to the physical information based on the classification model. This can be understood that the physical information generated from the time-frequency information is input to the classification model and control information matching the pattern of the input physical information among control information learned in the classification model is output.

In this regard, the intention determination device 200 may evaluate the performance of generating the control information according to the physical information of the generated classification model, and at this time, the intention determination device 200 may evaluate the performance of the classification model using a technique such as a cross-validation method, a mutual information amount, and Fisher's Score.

Here, the cross-validation method means generating a classification model using some of the information used to generate the classification model, and determining the performance of the classification model using the remaining information.

Meanwhile, in a case where it is determined that the control information according to the physical information generated from the time-frequency information does not exist, the intention determination device 200 may change the time range, the time interval, and the frequency band from which the time-frequency information is extracted. Accordingly, the intention determination device 200 may regenerate physical information from time-frequency information having different time and frequency, and input the regenerated physical information to the classification model to generate matched control information.

Accordingly, the intention determination device 200 may store the changed time range, time interval, and frequency band, and may apply this to time-frequency information generated by collecting other brain signals.

The intention determination device 200 may output a control command matching the control information. At this time, the control command may be a command provided to control the external device 300 according to a brain signal by the user's imagination, and accordingly, outputting the control command may be transmitting the control command from the intention determination device 200 to the external device 300 using the wired or wireless network.

For example, the control command may be a command for controlling a robot arm designated as the external device 300 to pick up a cup. In addition, the control command may be a command for controlling a sound output device designated as the external device 300 to output the sentence "Hello".

In this regard, the external device 300 may mean a device that is controlled according to the control command. The external device 300 as described above may be a robot arm, a robot hand, a robot leg, or the like created after a body part, the external device 300 may be a device that outputs a sound such as sentences or words set in advance according to the user's speech imagery, or the external device 300 may be a display device that stores an image set in advance to output a scene that the user imagines.

Figure 2:
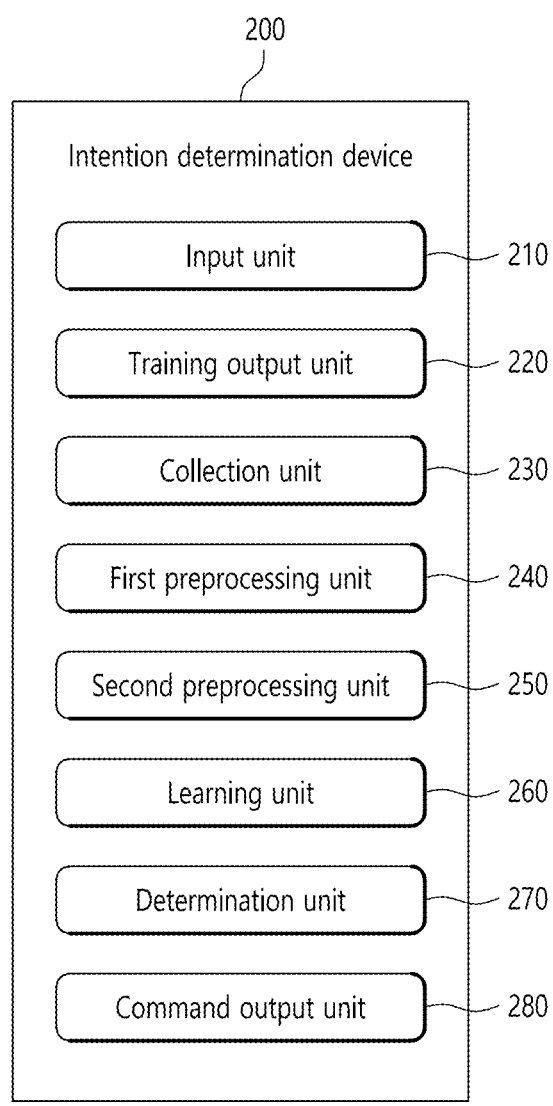
FIG. 2 is a control block diagram of the brain-machine interface based intention determination device using a virtual environment according to the embodiment of the present disclosure.

FIG. 2 is a control block diagram of the brain-machine interface based intention determination device using a virtual environment according to the embodiment of the present disclosure.

The brain-machine interface based intention determination device 200 using a virtual environment may include an input unit 210, a training output unit 220, a collection unit 230, a first preprocessing unit 240, a second preprocessing unit 250, a learning unit 260, a determination unit 270, and a command output unit 280.

The input unit 210 may receive control modes from the user. Here, the control modes may include an imagination mode classified according to the type of imagination, a space mode including at least one space prepared in advance as a virtual environment, and a motion mode including at least one motion provided to be imagined by the user according to the imagination mode and the space mode.

The training output unit 220 may output training information set according to the control modes. Here, the training information may mean the control mode selected according to a user's input.

The collection unit 230 may collect a brain signal generated from a user's imagination for the training information.

The first preprocessing unit 240 may extract frequency information from the brain signal according to a preset frequency band, and the first preprocessing unit 240 may extract time-frequency information of a preset time range from the frequency information.

At this time, the first preprocessing unit 240 may extract the frequency information from frequency bands set differently according to the control modes.

Meanwhile, the first preprocessing unit 240 may extract a plurality of pieces of frequency information from the brain signal, and for this, the first preprocessing unit 240 may extract the frequency information from a plurality of frequency bands according to a preset frequency range.

In addition, the first preprocessing unit 240 may extract time-frequency information of a preset time range from the extracted frequency information, and in this case, the first preprocessing unit 240 may extract a plurality of pieces of time-frequency information from one piece of frequency information.

The second preprocessing unit 250 may generate physical information indicating a physical size of the extracted time-frequency information. In this case, the second preprocessing unit 250 may generate the physical information by calculating a power spectrum density from the extracted time-frequency information.

The learning unit 260 may generate a classification model by learning control information indicating a user's intention according to a pattern of physical information provided in advance.

The determination unit 270 may determine the control information according to the physical information based on the classification model.

Meanwhile, in a case where it is determined that the control information according to the physical information generated from the time-frequency information does not exist, the determination unit 270 may change the time range, the time interval, and the frequency band from which the time-frequency information is extracted.

The command output unit 280 may output a control command matching the control information, which may be transmitting the control command from the command output unit 280 to the external device 300 using the wired or wireless network.

Figure 3:
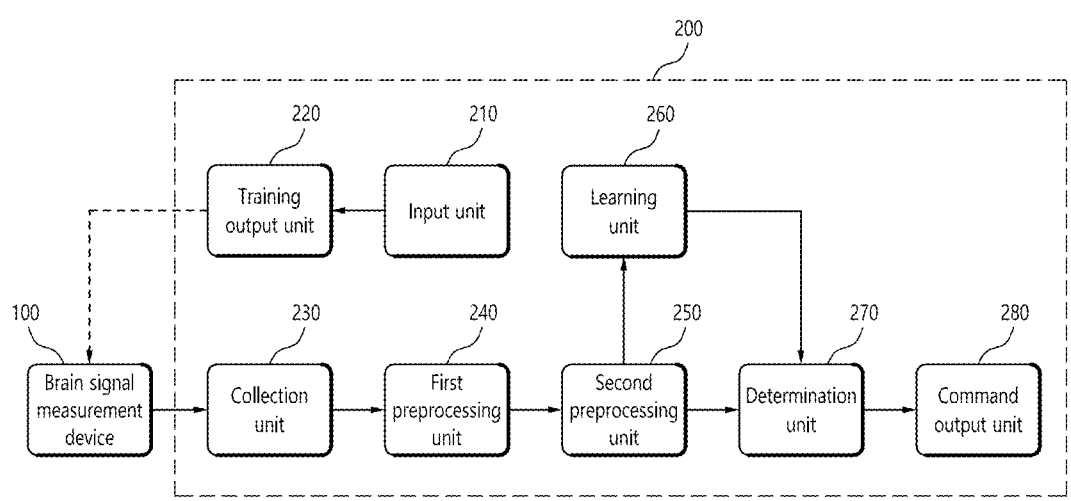
FIG. 3 is a block diagram showing a process of outputting a control command from a command output unit of FIG. 2.

FIG. 3 is a block diagram showing a process of outputting the control command from the command output unit of FIG. 2.

Referring to FIG. 3, the input unit 210 may receive a control mode from the user, and accordingly, the training output unit 220 may output training information set according to the control mode.

Meanwhile, the brain signal measurement device 100 may detect a brain signal generated from a user's imagination for the training information output from the training output unit 220, and accordingly, the collection unit 230 may receive and collect the brain signal from the brain signal measurement device 100.

At this time, the first preprocessing unit 240 may extract frequency information from the brain signal according to a preset frequency band, and the first preprocessing unit 240 may extract time-frequency information of a preset time range from the frequency information.

In addition, the second preprocessing unit 250 may generate physical information indicating a physical size of the extracted time-frequency information.

Accordingly, the determination unit 270 may determine control information according to the physical information based on the classification model generated by learning control information indicating a user's intention according to a pattern of physical information provided in advance.

For this, the learning unit 260 may generate a classification model by learning the control information indicating the user's intention according to the pattern of the physical information provided in advance. In this case, the control information indicating the user's intention according to the pattern of the physical information provided in advance may be learned by receiving control information on the physical information input from the second preprocessing unit 250, or may be learned by receiving physical information from an external server device and control information according to the corresponding physical information.

Meanwhile, the command output unit 280 may output a control command matching the control information, which may be transmitting the control command from the command output unit 280 to the external device 300 using the wired or wireless network.

Figure 4:
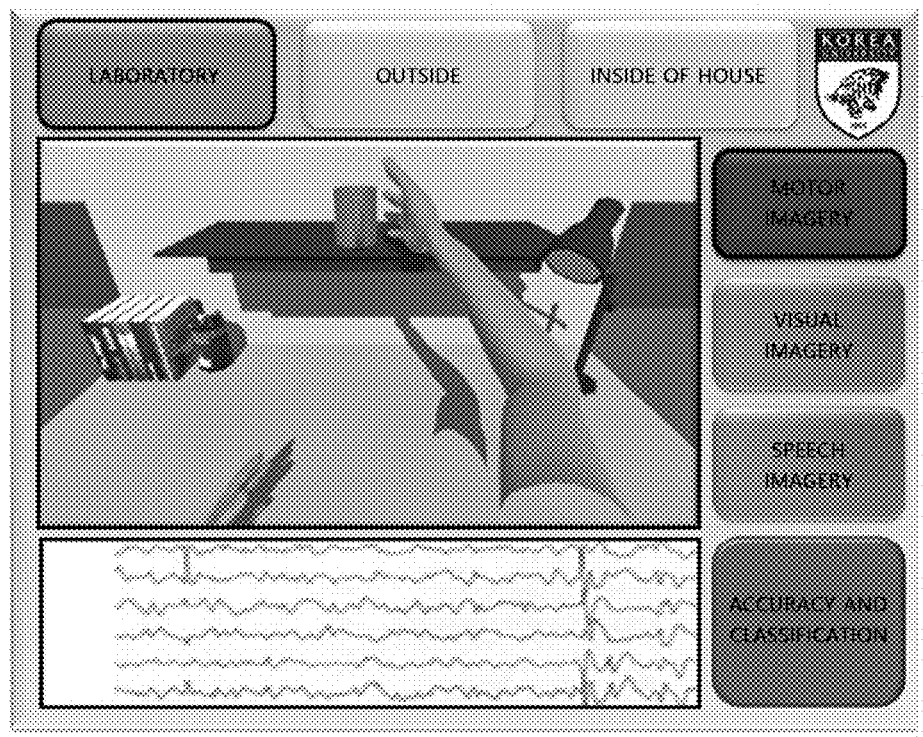
FIGS. 4 to 6 are schematic diagrams showing an embodiment in which training information is output from a training output unit of FIG. 2.
Figure 5:
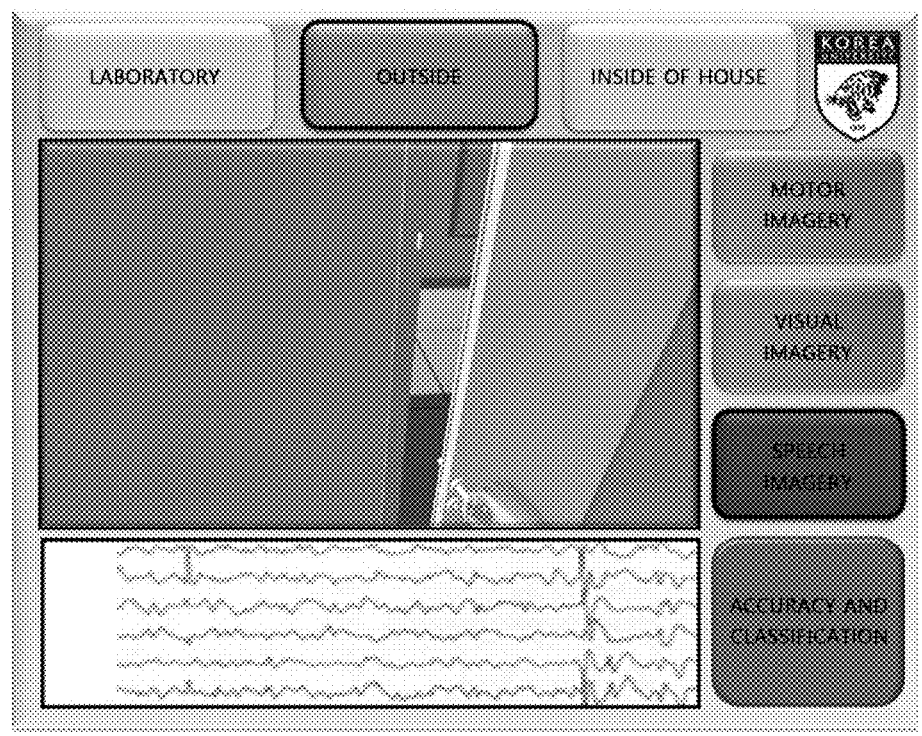
Figure 6:
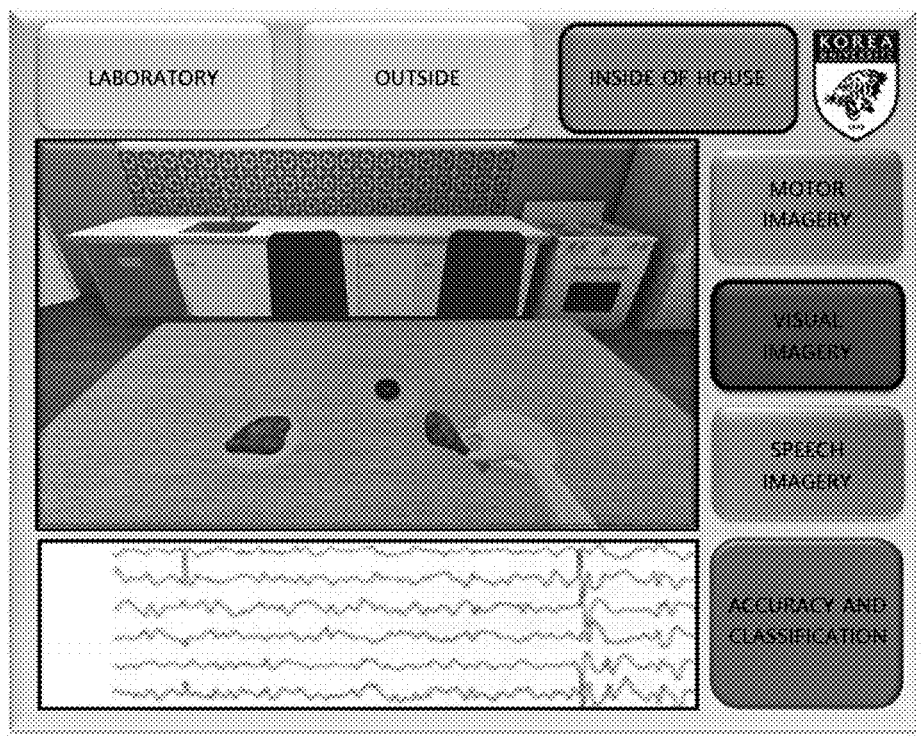

FIGS. 4 to 6 are schematic diagrams showing an embodiment in which training information is output from the training output unit of FIG. 2.

Referring to FIG. 4, training information in which the motor imagery mode as the control mode, a laboratory, and a motion of picking up a cup are input and output can be checked.

Referring to FIG. 5, training information in which the speech imagery mode as the control mode, outside, and a motion of pronouncing "Welcome" are input and output can be checked. At this time, the contents of the speech are not shown in the drawings, but in general, the sentence "Welcome" is a sentence spoken while performing a motion of opening the front door, and it can be understood that FIG. 5 shows training information provided to pronounce the sentence "Welcome".

Referring to FIG. 6, training information in which the visual imagery mode as the control mode, inside of house, and a scene of eating food at the table are output can be checked.

As described above, the training information may mean the control mode selected according to a user's input, and in this case, the control mode may include the imagination mode classified according to the type of imagination, the space mode including at least one space prepared in advance as the virtual environment, and the motion mode including at least one motion provided to be imagined by the user according to the imagination mode and the space mode.

Meanwhile, as shown in FIGS. 4 to 6, the training output unit 220 may further output a brain signal collected by the collection unit 230, and in this case, the training output unit 220 may output the time-frequency information extracted by the first preprocessing unit 240 for each frequency band.

Figure 7:
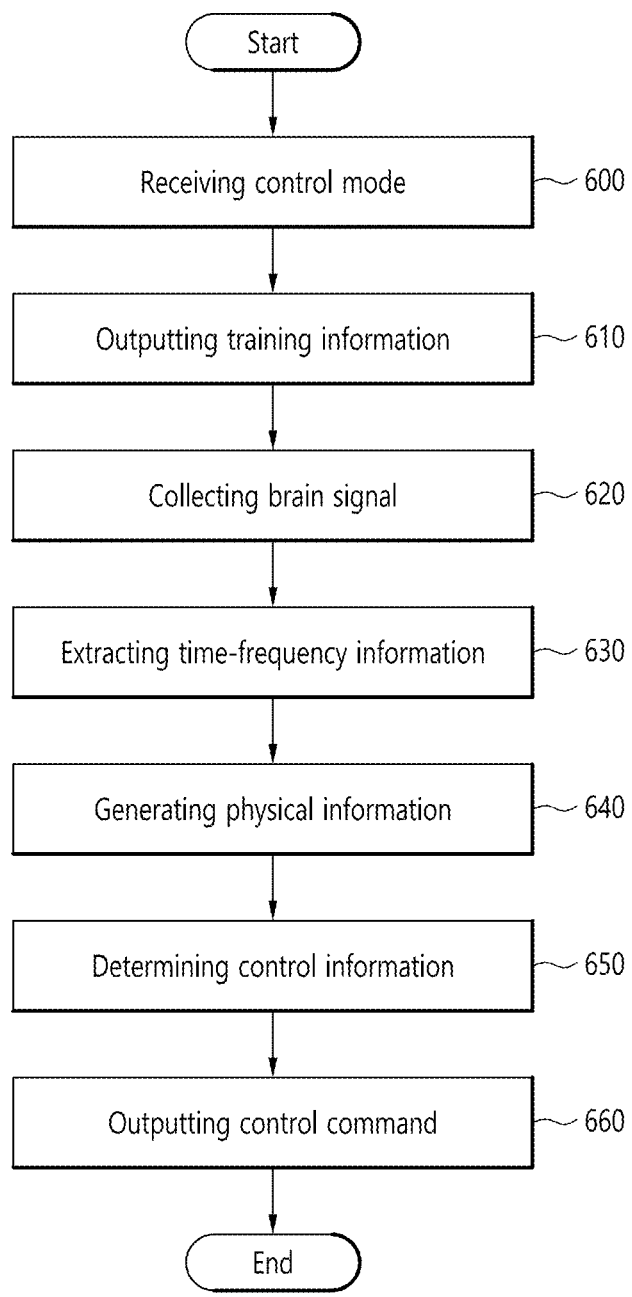
FIG. 7 is a flowchart of an intention determination method according to an embodiment of the present disclosure.

FIG. 7 is a flowchart of an intention determination method according to an embodiment of the present disclosure.

Since the intention determination method according to the embodiment of the present disclosure proceeds on substantially the same configuration as the brain-machine interface based intention determination device 200 using a virtual environment shown in FIG. 1, like elements the same as the brain-machine interface based intention determination device 200 using a virtual environment are denoted by like reference numerals, and repeated descriptions will be omitted.

The intention determination method may include a step 600 of receiving a control mode, a step 610 of outputting training information, a step 620 of collecting a brain signal, a step 630 of extracting time-frequency information, a step 640 of generating physical information, a step 650 of determining control information, and a step 660 of outputting a control command.

In the step 600 of receiving a control mode, a control mode may be input from the user. Here, the control mode may include the imagination mode classified according to the type of imagination, the space mode including at least one space prepared in advance as the virtual environment, and the motion mode including at least one motion provided to be imagined by the user according to the imagination mode and the space mode.

In the step 610 of outputting training information, training information set according to the control mode may be output. Here, the training information may mean the control mode selected according to a user's input.

In the step 620 of collecting a brain signal, a brain signal generated from a user's imagination for the training information may be collected.

In the step 630 of extracting time-frequency information, frequency information may be extracted from the brain signal according to a preset frequency band, and in the step 630 of extracting time-frequency information, time-frequency information of a preset time range may be extracted from the frequency information.

In this case, in the step 630 of extracting time-frequency information, the frequency information may be extracted from frequency bands set differently according to the control mode.

Meanwhile, in the step 630 of extracting time-frequency information, a plurality of pieces of frequency information may be from the brain signal, and for this, in the step 630 of extracting time-frequency information, the frequency information may be extracted from a plurality of frequency bands according to a preset frequency range.

In addition, in the step 630 of extracting time-frequency information, time-frequency information of a preset time range may be extracted from the extracted frequency information, and in this case, in the step 630 of extracting time-frequency information, a plurality of pieces of time-frequency information may be extracted from one piece of frequency information.

In the step 640 of generating physical information, physical information indicating a physical size of the extracted time-frequency information may be generated. In this case, in the step 640 of generating physical information, the physical information may be generated by calculating a power spectrum density from the extracted time-frequency information.

In the step 650 of determining of control information, control information according to the physical information may bd determined based on the classification model generated by learning control information indicating a user's intention according to a pattern of physical information provided in advance.

In the step 660 of outputting a control command, a control command matching the control information may be output, and in this case, in the step 660 of outputting a control command, the control command may be transmitted to the external device 300 using the wired or wireless network.

Figure 8:
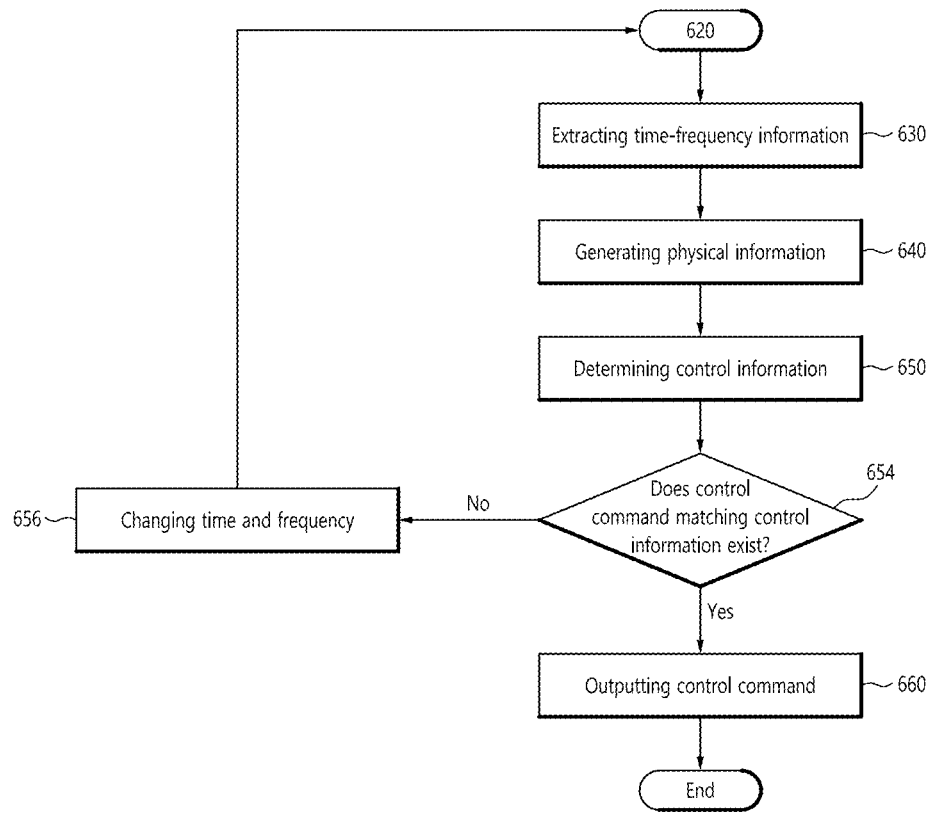
FIG. 8 is a detailed flowchart of a step of determining control information of FIG. 7.

FIG. 8 is a detailed flowchart of the step of determining control information of FIG. 7.

In the step 650 of determining control information, in a case where it is determined that the control information matching the physical information generated from the time-frequency information does not exist (654), the time range, the time interval, and the frequency band from which the time-frequency information is extracted may be changed (656).

Accordingly, in the intention determination method, physical information may be regenerated from time-frequency information having different time and frequency, and the regenerated physical information may be input to the classification model to generate matched control information.

While the present disclosure has been described with respect to the specific embodiments, it will be apparent to those skilled in the art that various changes and modifications may be made without departing from the spirit and scope of the disclosure as defined in the following claims.

DETAILED DESCRIPTION OF MAIN ELEMENTS

1: Intention determination system
100: Brain signal measurement device
200: Intention determination device
300: External device

What is claimed is:

1. A device configured to perform an intention determination process, the process comprising:
receiving an indication of a thought mode selected by a user input;
selecting content according to the indication of the thought mode;
displaying the content while collecting a first brain signal sensed from the user while the user is viewing the displayed content;
extracting a first filtered signal from the first brain signal using a frequency band filter selected based on the indication of the thought mode, wherein the thought mode is selected from predefined thought modes, and the frequency band filter is selected from a plurality of frequency band filters each associated with the predefined thought modes;
generating physical information representing a physical magnitude of the extracted first filtered signal by calculating a first power spectral density from the extracted first filtered signal;
determining control information according to the physical information based on a classification model generated by learning control information representing a user's intent according to a pattern in the physical information provided in advance;
outputting a control command when the control command matches the control information; and
when the control command does not match the control information, regenerating the physical information by calculating a second power spectral density based on a second brain signal having a time and frequency different from the first brain signal,
wherein the regenerated physical information is input to the classification model to generate matched control information.

2. The device according to claim 1, wherein the thought mode includes:
an imagination mode classified according to a type of imagination;
a space mode representing a space provided in advance as a virtual environment; and
a motion mode representing a motion provided to be imagined by the user according to the imagination mode and the space mode.

3. The device according to claim 1, wherein the thought mode is selected from a motor imagery mode, a visual imagery mode, and a speech imagery mode.

4. The device according to claim 3, wherein the thought mode is the motor imagery mode, and
wherein the frequency band filter is configured to filter a frequency band from 8 Hz to 13 Hz.

5. The device according to claim 3, wherein the thought mode is the visual imagery mode, and
wherein the frequency band filter is configured to filter a frequency band from 8 Hz to 12 Hz.

6. The device according to claim 3, wherein the thought mode is the speech imagery mode, and
wherein the frequency band filter is configured to filter a frequency band from Hz to 15 Hz.

7. The device of claim 1, wherein the predefined thought modes include a motor imagery mode and a speech imagery mode.

8. An intention determination method of determining a user's intention according to a brain-machine interface based intention determination device using a virtual environment, the intention determination method comprising:
receiving a control mode input from a user;
outputting training information set according to the control mode;

collecting a brain signal generated from an imagination of the user for the training information;

extracting frequency information according to a preset frequency band from the brain signal, and extracting time-frequency information of a preset time interval from the frequency information;

generating physical information representing a physical magnitude of the extracted time-frequency information by calculating a power spectral density from the extracted time-frequency information;

determining control information according to the physical information based on a classification model generated by learning control information indicating a user's intention according to a pattern in the physical information provided in advance;

outputting a control command when the control command matches the control information; and when the control command does not match the control information, regenerating the physical information by calculating another power spectral density based on another brain signal having a time and frequency different from the brain signal, wherein the regenerated physical information is input to the classification model to generate matched control information.

9. The intention determination method according to claim 8, wherein the control mode further includes:

an imagination mode classified according to a type of imagination;

a space mode representing a space provided in advance as a virtual environment; and a motion mode representing a motion provided to be imagined by the user according to the imagination mode and the space mode.

10. The intention determination method according to claim 8, wherein, in the receiving of the control mode, at least one imagination mode among a motor imagery mode, a visual imagery mode, and a speech imagery mode is input.

11. The intention determination method according to claim 10, wherein, in the extracting of the time-frequency information, when the imagination mode is the motor imagery mode, the frequency information is extracted from a frequency band of 8 Hz to 13 Hz.

12. The intention determination method according to claim 10, wherein, in the extracting of the time-frequency information, when the imagination mode is the visual imagery mode, the frequency information is extracted from a frequency band of 8 Hz to 12 Hz.

13. The intention determination method according to claim 10, wherein, in the extracting of the time-frequency information, when the imagination mode is the speech imagery mode, the frequency information is extracted from a frequency band of 10 Hz to 15 Hz.

14. The intention determination method according to claim 8, wherein the intention determination device is configured to extract the time-frequency information of a time range of 5,000 ms from the extracted frequency information of 30,000 ms.

15. The intention determination method according to claim 8, wherein the pattern of physical information is determined by a frequency band and a time range of any of the time-frequency information from which the physical information is generated, and a temporal position of the time-frequency information in the frequency information.

16. The intention determination method according to claim 8, wherein the classification model is obtained by learning a pattern of physical information for a brain signal occurring by any of a visual scene and an action that makes a sound.

\* \* \* \* \*